United States Patent
diGirolamo et al.

(10) Patent No.: US 8,683,770 B2
(45) Date of Patent: Apr. 1, 2014

(54) CONNECTOR ASSEMBLY FOR CONNECTING BUILDING MEMBERS

(75) Inventors: Edward R. diGirolamo, Raleigh, NC (US); John C. Herrmann, Raleigh, NC (US); James E. Herrmann, Raleigh, NC (US); Michael A. Shultz, Apex, NC (US)

(73) Assignee: The Steel Network, Inc., Durham, NC (US)

( * ) Notice: Subject to any disclaimer, the term of this patent is extended or adjusted under 35 U.S.C. 154(b) by 90 days.

(21) Appl. No.: 13/542,854

(22) Filed: Jul. 6, 2012

(65) Prior Publication Data

US 2012/0266545 A1 Oct. 25, 2012

Related U.S. Application Data

(63) Continuation-in-part of application No. 12/629,979, filed on Dec. 3, 2009, now Pat. No. 8,181,419.

(51) Int. Cl.
*E04B 1/38* (2006.01)
*E04B 1/24* (2006.01)

(52) U.S. Cl.
CPC .......... *E04B 1/38* (2013.01); *E04B 2001/2415* (2013.01); *E04B 2001/2439* (2013.01); *Y10S 248/909* (2013.01)
USPC ................. 52/655.1; 52/100; 52/281; 52/712; 248/909; 403/2

(58) Field of Classification Search
CPC .......... E04B 1/2608; E04B 1/38; E04B 1/40; E04B 1/54; E04B 1/61; E04B 7/045; E04B 2001/2415; E04B 2001/2439
USPC ........... 52/98, 100, 167.1, 167.3, 167.4, 281, 52/573.1, 655.1, 712, 745.19; 403/2; 248/548, 909
See application file for complete search history.

(56) References Cited

U.S. PATENT DOCUMENTS

| | | | | | |
|---|---|---|---|---|---|
| 5,313,752 | A | * | 5/1994 | Hatzinikolas | 52/243 |
| 5,467,566 | A | * | 11/1995 | Swartz et al. | 52/235 |
| 5,846,018 | A | * | 12/1998 | Frobosilo et al. | 403/403 |
| 5,876,006 | A | * | 3/1999 | Sharp et al. | 248/297.21 |
| 5,906,080 | A | * | 5/1999 | diGirolamo et al. | 52/243.1 |
| 6,213,679 | B1 | * | 4/2001 | Frobosilo et al. | 403/403 |
| 6,612,087 | B2 | * | 9/2003 | diGirolamo et al. | 52/712 |
| 7,479,508 | B2 | * | 1/2009 | Embil et al. | 514/605 |
| 7,503,150 | B1 | * | 3/2009 | diGirolamo et al. | 52/702 |
| 8,181,419 | B1 | * | 5/2012 | diGirolamo | 52/745.19 |
| 2009/0113839 | A1 | * | 5/2009 | Carr | 52/712 |

* cited by examiner

*Primary Examiner* — William Gilbert
(74) *Attorney, Agent, or Firm* — Coats and Bennett PLLC

(57) ABSTRACT

A building assembly utilized in connecting building members together while permitting limited relative movement between the members. The assembly includes a structure such as a track or plate that includes one or more longitudinal slots. Integrally formed in the longitudinal slot is a breakaway washer that receives a fastener that extends into an adjacent structure. When a certain force is applied to the breakaway washer, the breakaway washer breaks away from the slot and this permits the slot to move about the breakaway washer and fastener which results in there being relative movement between two connected structures.

22 Claims, 8 Drawing Sheets

CONNECTOR ASSEMBLY FOR CONNECTING BUILDING MEMBERS

The present application is a continuation-in-part of U.S. Pat. No. 8,181,419, issued May 22, 2012, entitled "Connector for Connecting Building Members". The contents of this patent are expressly incorporated herein by reference.

FIELD OF THE INVENTION

The present invention relates to lightweight metal building components and more particularly to connecting assemblies for connecting metal building components together.

BACKGROUND OF THE INVENTION

Movable or slideable construction member connections can be utilized in building design to prevent or limit damage due to varying or dynamic loads. Varying loads can arise from movement of equipment and personnel in the building as well as from environmental factors such as high winds and seismic activity. Flexing of construction members under varying load is expected and acceptable within code-specified limits. However, such flexing often means that some connections between members can cause damage if some relative movement between the connected members is not allowed. The building industry has recognized this problem. Movement between connected members has been accommodated by having sliding connections between the members to permit limited relative movement between the members while keeping the members otherwise securely connected together.

An approach commonly used is that of a slotted connection. In a typical configuration, a connector in the form of a plate or bracket is rigidly secured to or part of one of the members and slideably connected to the other member by means of one or more slots and fasteners. Typically the plate has slots, and shouldered or bushed screws, are projected through slots and into the other member. The screws are tightened to secure the members together but yet permit the members some range of relative sliding movement. The head of the fastener is prevented by the shoulder or bushing from clamping against the connector plate so that the plate can move along the length of the slot. For a more complete and detailed description of such connection devices, reference is made to U.S. Pat. Nos. 5,906,080; 6,612,087; 5,467,566; 7,503,150; and, 8,181,419; the disclosures of these patents are expressly included herein by reference.

The degree to which such devices function as intended is dependent upon proper installation. For example, should a shouldered screw be inserted and tightened off center in the slot, the shoulder would overlap and clamp the plate to the member. This clamping would render the connection more or less rigid and not slideable. Avoiding this kind of improper installation requires time and installer dexterity to properly align the screw in the slot.

A need exists for a connection assembly that will provide for easy and accurate screw placement to prevent inadvertent clamping together of the building members being connected and to thus facilitate slideable connection between the members

SUMMARY OF THE INVENTION

The present invention relates to a metal building component that includes an elongated slot having a breakaway washer integrally formed therein. The breakaway washer in one embodiment includes a series of raised dimples that extend outwardly from the face of the washer. A fastener having a flange is inserted through a centering opening in the washer. The fastener extends through the breakaway washer and connects to another building structure or component. The raised dimples provide an interface between the breakaway washer and a flange that forms a part of the fastener. More particularly, the raised maintain a clearance between the fastener head and the building component so that slideability may be achieved.

In another embodiment, the breakaway washer design is similar but in this case instead of employing the raised dimples, the breakaway washer is provided with a raised burr. The raised burr serves as an interface between the breakaway washer and the flange of the fastener, maintaining a clearance between the fastener head and the building component so that slideability may be achieved.

In another embodiment of the present invention, there is provided a track that includes one or more breakaway washers in both the flanges and the web of the track. This enables the track to move vertically and horizontally once the breakaway washers break away from the slots.

Other objects and advantages of the present invention will become apparent and obvious from a study of the following description and the accompanying drawings which are merely illustrative of the invention.

DESCRIPTION OF EXEMPLARY EMBODIMENTS

Figure 1:
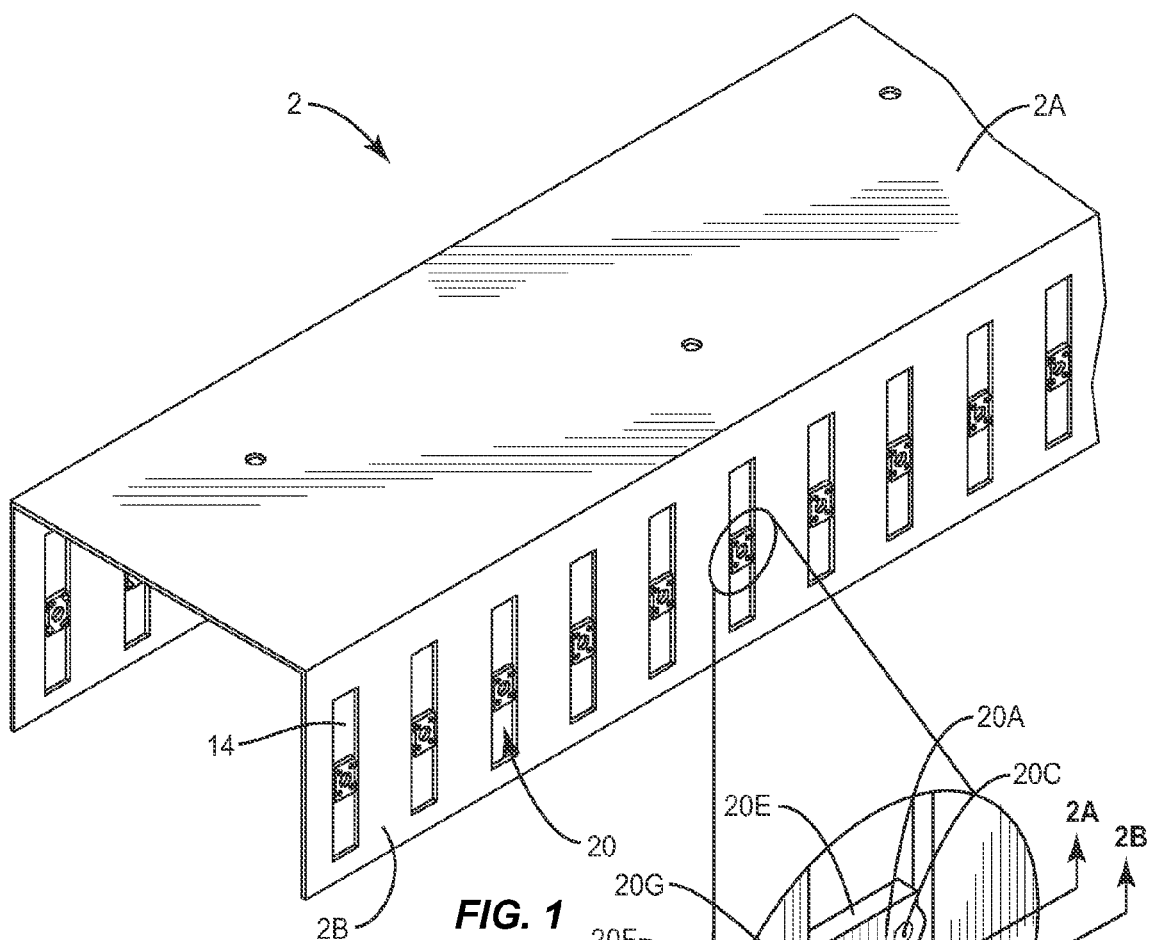
FIG. 1 is a perspective view of a metal building track having the breakaway washer incorporated therein.

With further reference to the drawings, a building structure or connector assembly is shown therein. With reference to FIG. 1 there is shown a metal track indicated generally by the numeral 2. Metal track 2 includes a pair of flanges 2B and a web 2A. Each flange includes a series of spaced apart slots 14. As seen in FIG. 1, each slot 14 is elongated and extends generally vertically. As will be appreciated by those skilled in the art, the track 2 is configured to connect to one or more studs via the flanges 2B. In addition, the web 2A of the track is typically connected to another building component or structure such as a floor or ceiling structure.

Figure 2:
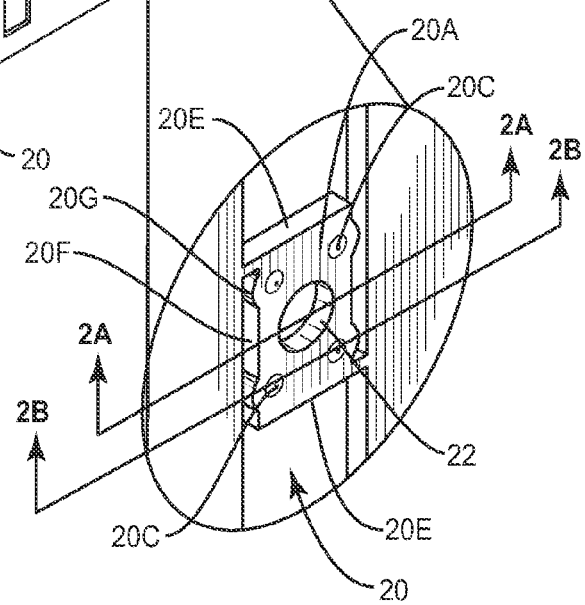
FIG. 2 is an enlarged view showing the face of the breakaway washer.
Figure 3:
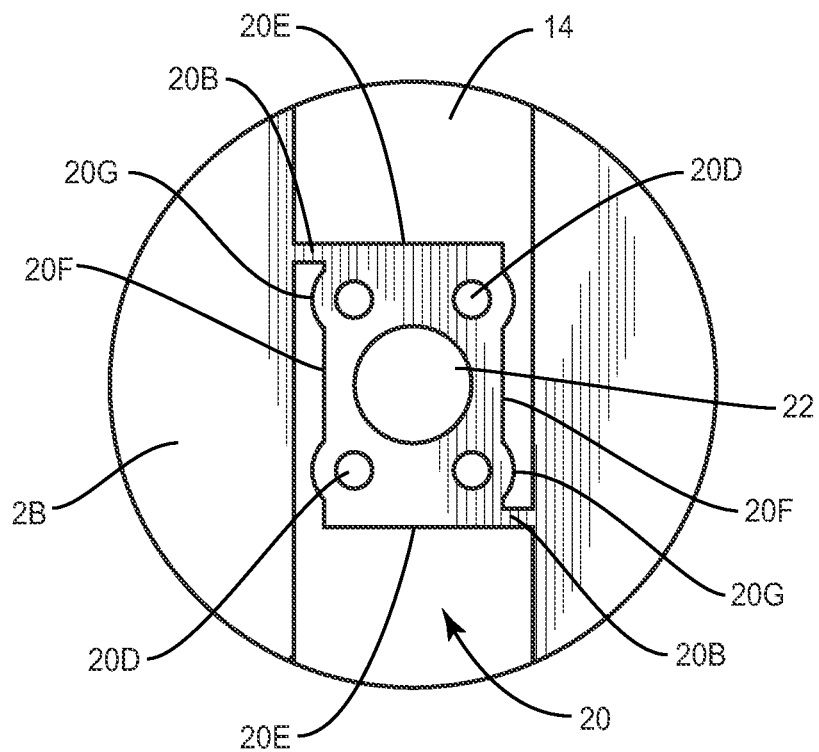
FIG. 3 is an enlarged plan view showing the backside of the breakaway washer connected in a slot.

Incorporated into the slots 14 of the building member 2 is a breakaway metal washer 20. The breakaway washer 20 shown in FIGS. 1-3 is designed to break away from its respective slot in response to a certain force or load being applied to the breakaway washer. The term "breakaway washer" means a member having a fastener opening and disposed in an elongated slot and initially fixed relative to the slot but designed to break away from the slot in response to a certain force being applied to it and to allow relative motion between the slot and the breakaway washer after it has broken away from the slot. The term "breakaway washer" does not imply a meaning normally associated with a conventional washer.

Viewing the breakaway washer 20 shown in FIGS. 1-3, the same includes a main body. Projecting from the main body is a pair of offset tabs 20B. As seen in the drawings, the offset tabs 20B join opposed edges of one slot 14. One advantage of the present design for the breakaway washer 20 is that the width of the tabs 20B can be more closely controlled. This provides the ability to adjust the actual force required to break the washer 20 loose. The main body of the breakaway washer 20 includes a fastener-centering opening 22 for receiving the shaft of a fastener 16 to be described subsequently herein. The main body further includes a face 20A. The face 20A of the main body faces outwardly and the face is generally flat and includes a surface area.

Formed in the main body of the breakaway washer 20 is a series of dimples 20C. The dimples 20C project outwardly from the face 20A of the breakaway washer 20. More particularly, the series of dimples 20C project slightly out of the planar face of the main body of the breakaway washer 20. The height of the dimples can vary but in one embodiment, the dimple height is approximately 0.005 inches above the planar surface of the face 20A. As will be discussed later, the purpose of the dimples 20C is to provide clearance between the screw head and the main body of the flange 2B. In one embodiment, the slot 14 should be able to move relative to the breakaway washer 20 when the washer actually breaks away. If the fastener binds the breakaway washer to the flange 2B, then it is possible that the breakaway washer will not freely move within the slot 14. Thus the dimples 20C effectively provide clearance between the face 16C of the fastener 16 and the main body of the flange 2B, and that makes it more likely that when the breakaway washer actually breaks away in the slot 14 that the slot can freely move relative to the breakaway washer.

FIG. 3 shows the backside of the breakaway washer. Opposite the dimples 20C is a series of slight depressions 20D. When the depressions 20D are formed, this tends to disperse metal in the breakaway washer 20 and causes the formation of the arcuate bulges 20G. See FIGS. 2 and 3. The arcuate bulges 20G occupy space and tend to partially close the gap between the main body of the washer 20 and the edges of the slot 14. This has the advantage of limiting the side-to-side movement of the main body once the washer has broken away from the slot 14. The arcuate bulges 20G are optional. In other embodiments, there would be no arcuate bulges 20G. Instead the opposed sides of the breakaway washer 20 would be straight. In addition the main body includes upper and lower edges 20E and side edges 20F.

Figure 5:
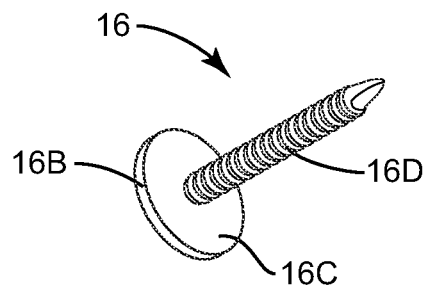
FIG. 5 is a perspective view of the fastener employed with the breakaway washer.

Forming a part of the connector assembly or the building assembly of the present invention is a fastener indicated generally by the numeral 16. Fastener 16 includes an enlarged head or flange 16B. Flange 16B includes a face 16C and the fastener 16 further includes a shaft 16D. The design of the assembly disclosed herein is aimed at making the fastener 16 a conventional fastener. Typically fastener 16 is a so called "modified truss-head" screw also known as a "lath" screw. See FIG. 5. Note the enlarged flange 16B of the fastener 16. The flange 16B is wider than the width of the slot 14. In the embodiments illustrated herein, there is no shoulder provided between the flange 16B and the shaft 16D. Again the fastener 16 is a conventional fastener. This has the advantage of making it easier for contractors to obtain rather than having to order special screws, especially screws having a certain size shoulder.

Figure 4:
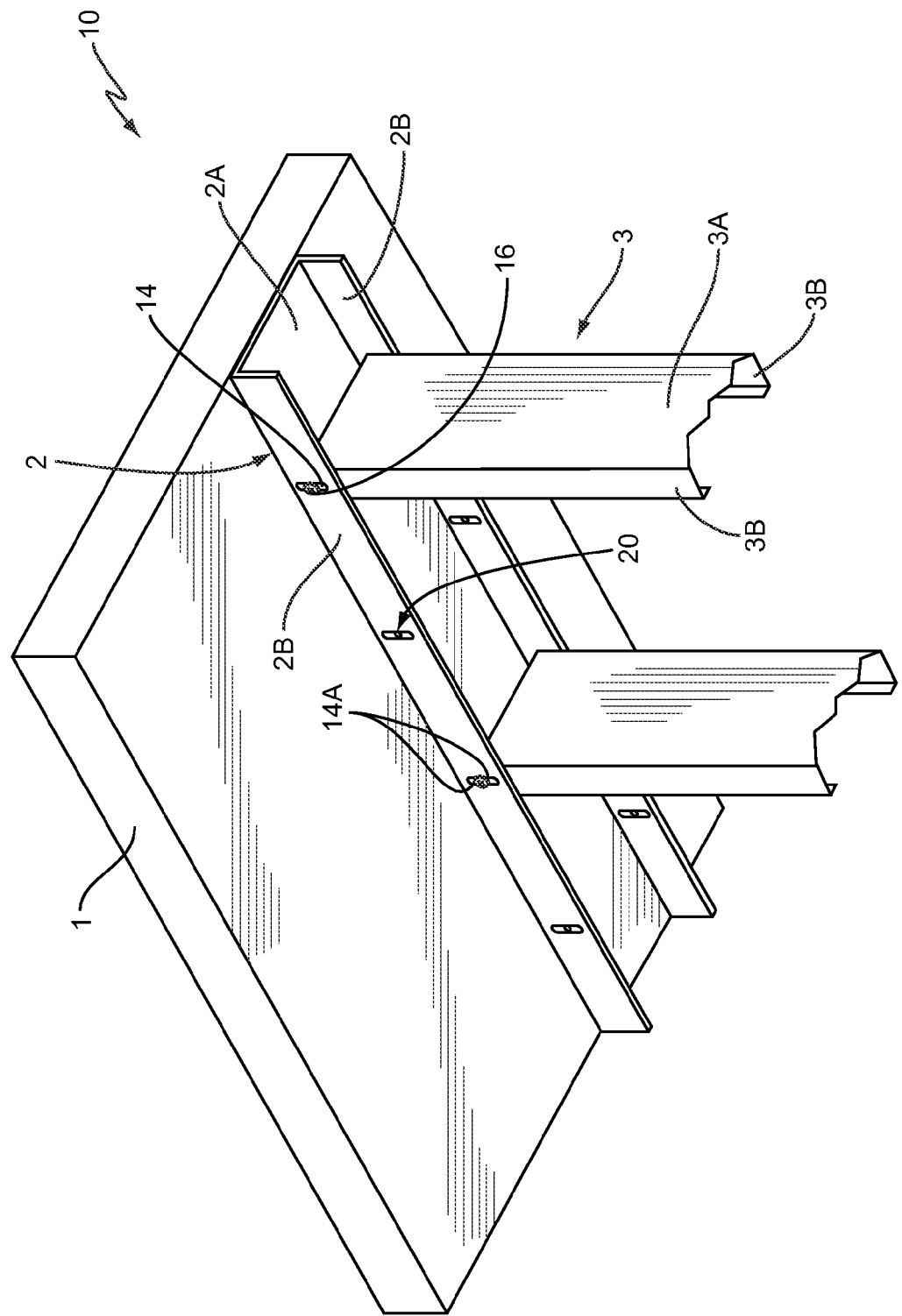
FIG. 4 is a fragmentary perspective view of a portion of a building structure showing the use of the breakaway washer to connect a series of studs to a track.

A typical application of the track 2 is shown in FIG. 4. Here track 2 is connected to a series of studs 3 and to a floor or ceiling structure 1. As will be appreciated by those skilled in the art, the connection that exists between the studs 3 and the track 2 enable relative movement between the track and the studs.

At each connection point between the track 2 and the stud 3, the fastener 16 projects through the fastener center opening 22 and the breakaway washer 20 and into the flange 3B of the stud 3. Note that the dimples 20C face the face 16C of the fastener 16. As the fastener 16 is screwed into the flange 3B of the stud 3, the face 16C of the fastener will only contact the raised dimples 20C. That is the dimples 20C serve as a separator between the main body of the flange 2B and the face 16C of the fastener. In other words, the dimples 20C tightly clamp the breakaway washer 20 against the flange 3B of the stud but allow movement of the slot relative to the breakaway washer. As discussed above, this assures that once the breakaway washer is broken loose from the slot the slot can move freely about the washer and enable relative movement between the track 2 and the studs 3.

Figure 2A:
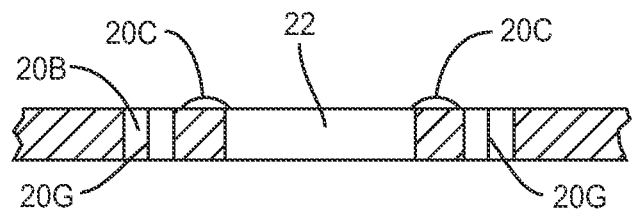
FIG. 2A is a sectional view taken through the line 2A-2A of FIG. 2.
Figure 2B:
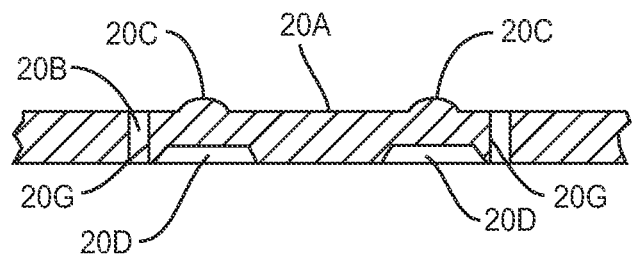
FIG. 2B is a sectional view taken through the line 2B-2B of FIG. 2.
Figure 6:
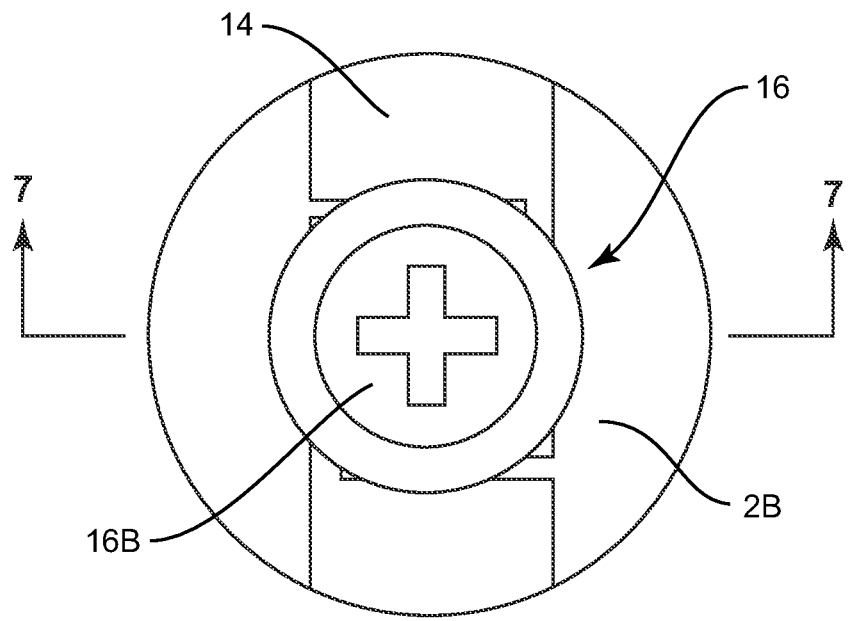
FIG. 6 is a fragmentary side elevational view showing the fastener extending through the breakaway washer.
Figure 7:
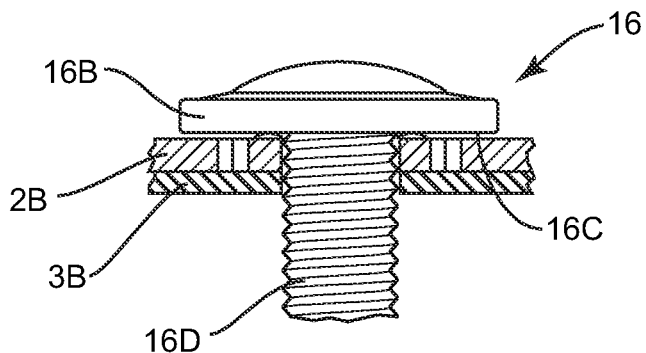
FIG. 7 is a sectional view taken through the line 7-7 of FIG. 6.

Note FIGS. 2A and 2B which show the dimples 20C raised above the planar surface of the main body of the breakaway washer 20. Also in FIGS. 2A and 2B it can be seen that by forming the dimples 20C that the underlying depressions of 20D cause portions of the metal to bulge out to one side to form the arcuate bulges 20G that tend to limit the side-to-side movement of the breakaway washer 20 when it breaks loose from the slot 14. Note that FIG. 6 shows the fastener flange 16B is sufficiently wide that it bridges the slot 14. Note in FIG. 7 where the dimples 20C are only slightly elevated over the face 20A of the breakaway washer 20 but that the dimples prevent the flange 16B from directly engaging the track flange 2B. More particularly, the washer 20 is only engaged to the stud flange 3B by the flange 16B via the dimples 20C.

Figure 8:
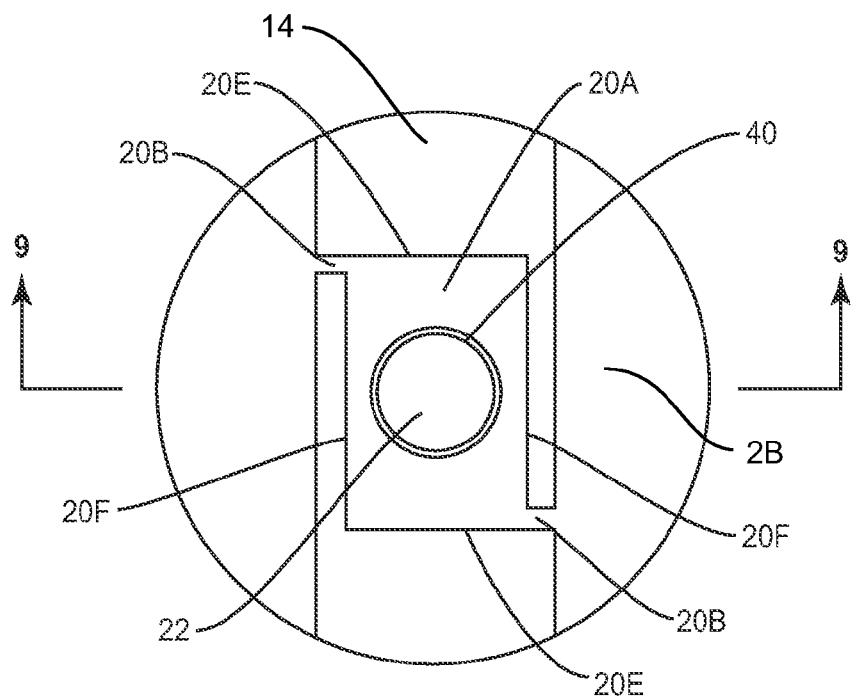
FIG. 8 is a fragmentary side view showing an alternate design for the breakaway washer.
Figure 9:
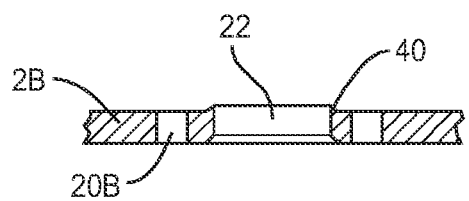
FIG. 9 is a sectional view taken through the line 9-9 of FIG. 8.
Figure 10:
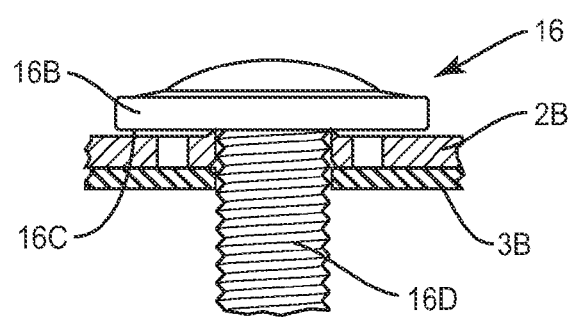
FIG. 10 is a sectional view showing the fastener extending through the breakaway washer shown in FIG. 8 and into an engagement with an adjacent stud.

Turning to FIGS. 8-10, another embodiment for the breakaway washer 20 is shown. This embodiment is similar to the embodiment shown in FIGS. 1-7. The main distinction is that the dimples 20C have been replaced with a burr 40. Note in FIG. 8 where the burr 40 is formed around the fastener centering opening 22 adjacent the face 20A of the breakaway washer 20. This is particularly shown in FIG. 9. Note that in this example that the burr 40 extends approximately 0.010 inches above the face 20A of the breakaway washer 20. Thus when the fastener 16 is extended through the centering opening 22 the flange 16B will engage the burr 40 and not the face 20A of the breakaway washer 20. Thus the burr 40 serves the same function as the raised dimples 20C discussed above.

Note in FIG. 10 where the slightly upwardly extending burr 40 engages the face 16C of the flange 16B and basically causes the flange 16B to be spaced from both the face 20A of the washer 20 and the flange 2B of the track 2. Again the fastener 16 clamps the washer 20 tightly against the flange 3B of the stud 3 but allows movement of the slot relative to the breakaway washer.

Figure 11:
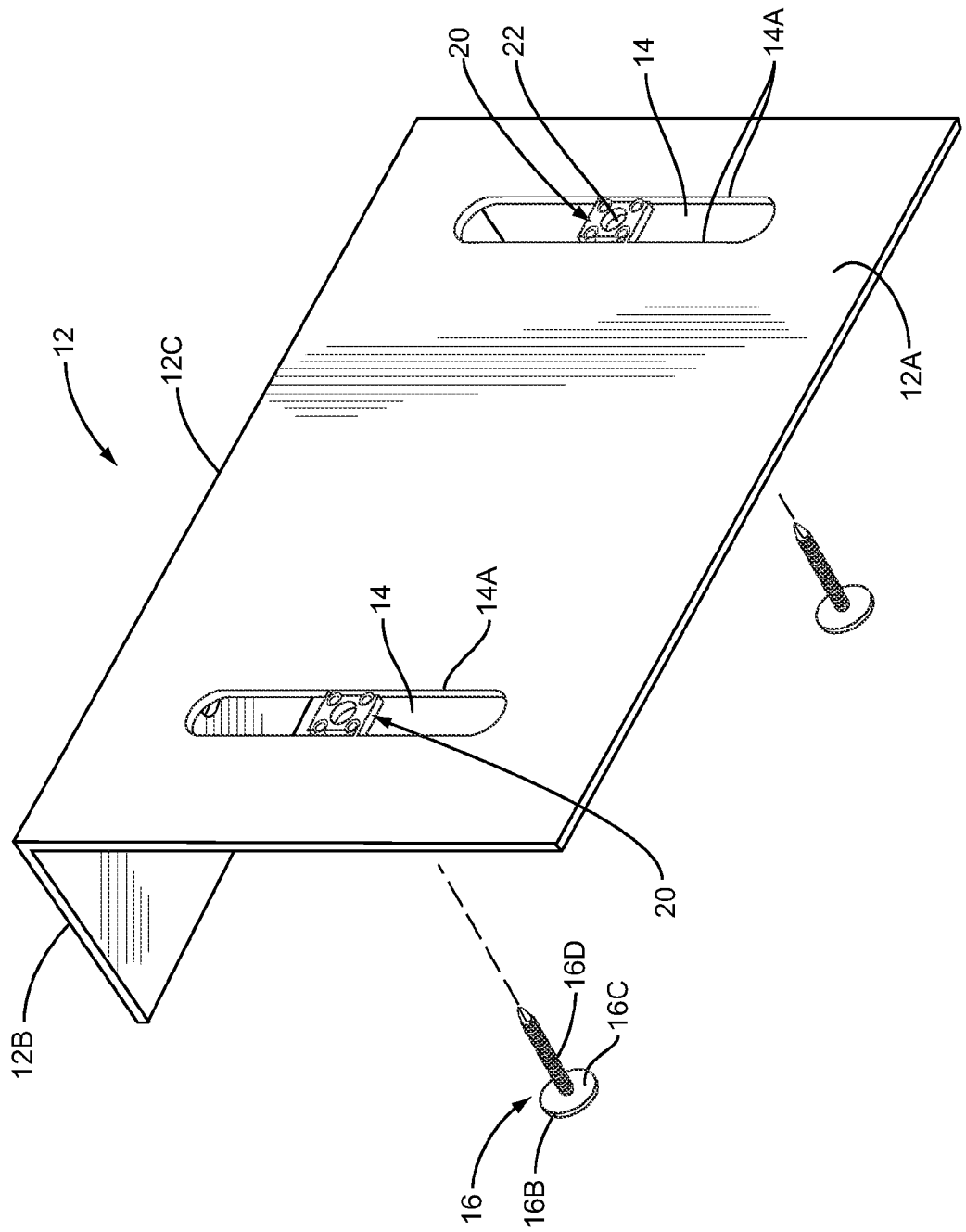
FIG. 11 shows one embodiment of the breakaway washer incorporated into a plate or clip structure.
Figure 11A:
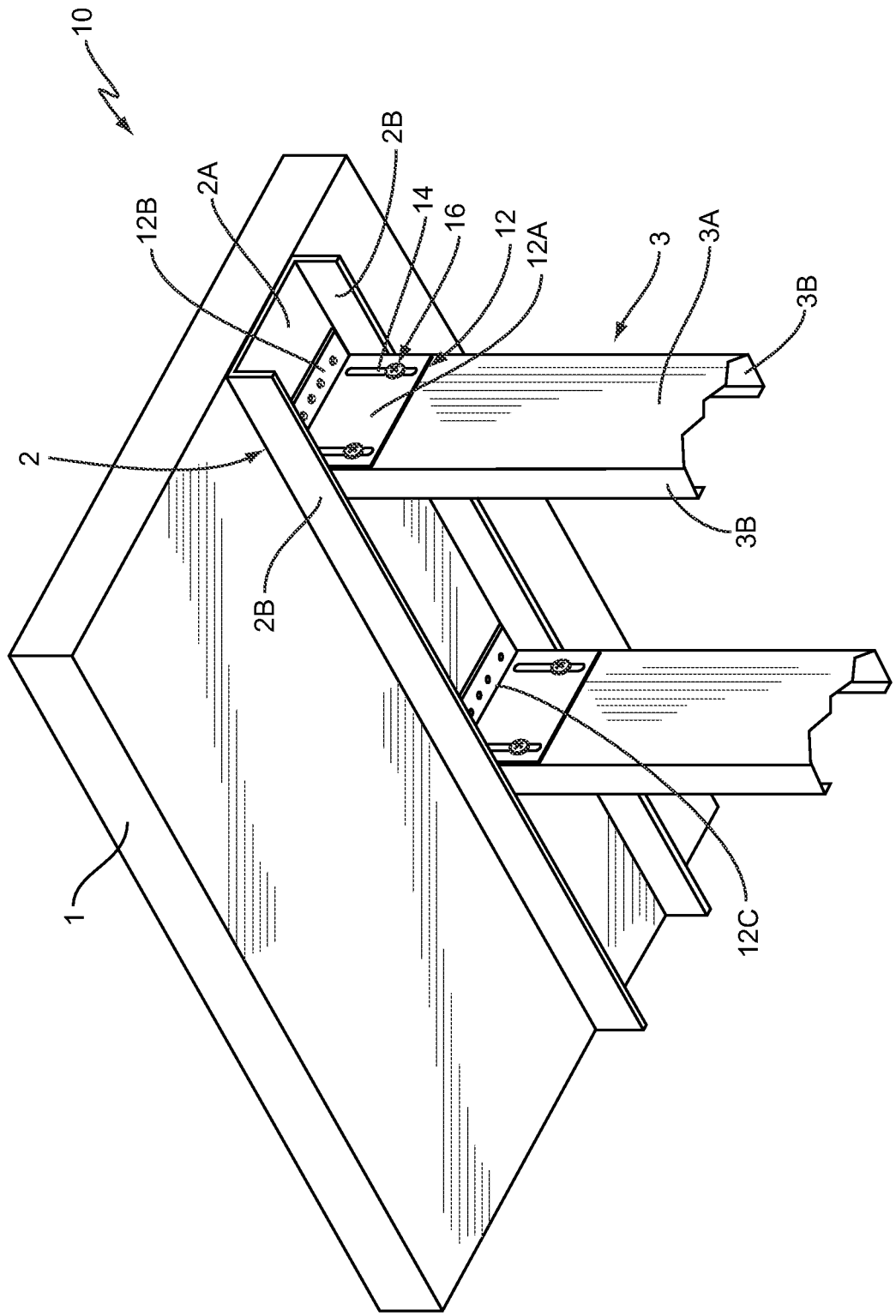
FIG. 11A is a perspective view showing the plate or clip structure of FIG. 11 interconnecting a stud with a track.

The breakaway washer 20 can be employed in various building components such as components that interconnect building members. For example, the breakaway washer 20 can be employed in a connecting plate or bracket such as that shown in FIG. 11 and indicated generally by the numeral 12. That is, the breakaway washer 20 having the raised dimples 20C or the burr 40 can be incorporated into the slots 14 of the plate 12. Plate 12 is bent in the form of a clip having a clip web 12A and a clip flange 12B disposed at approximately a right angle to the clip web. A bend in 12C is formed between the flange 12B and web 12A. The breakaway washer 20 having the raised dimples 20C is disposed within each slot 14 and the tabs thereof, tabs 20B, are connected to the edges of the slot. As noted above, the plate 12 can be utilized as part of a connecting assembly for connecting two building members together. For example the plate can be utilized to connect a stud to a track structure. In such an example, the web 12A is placed against the web 3A of the stud and fastener 16 is inserted through the breakaway washers 20 into the web of the stud. The flange 12B is in turn secured to the web of the track 2. Thus when the washers 20 break away from the slots 14 it follows that there can be relative movement between the studs 3 and the track 2. This example is illustrated in FIG. 11A.

Figure 12:
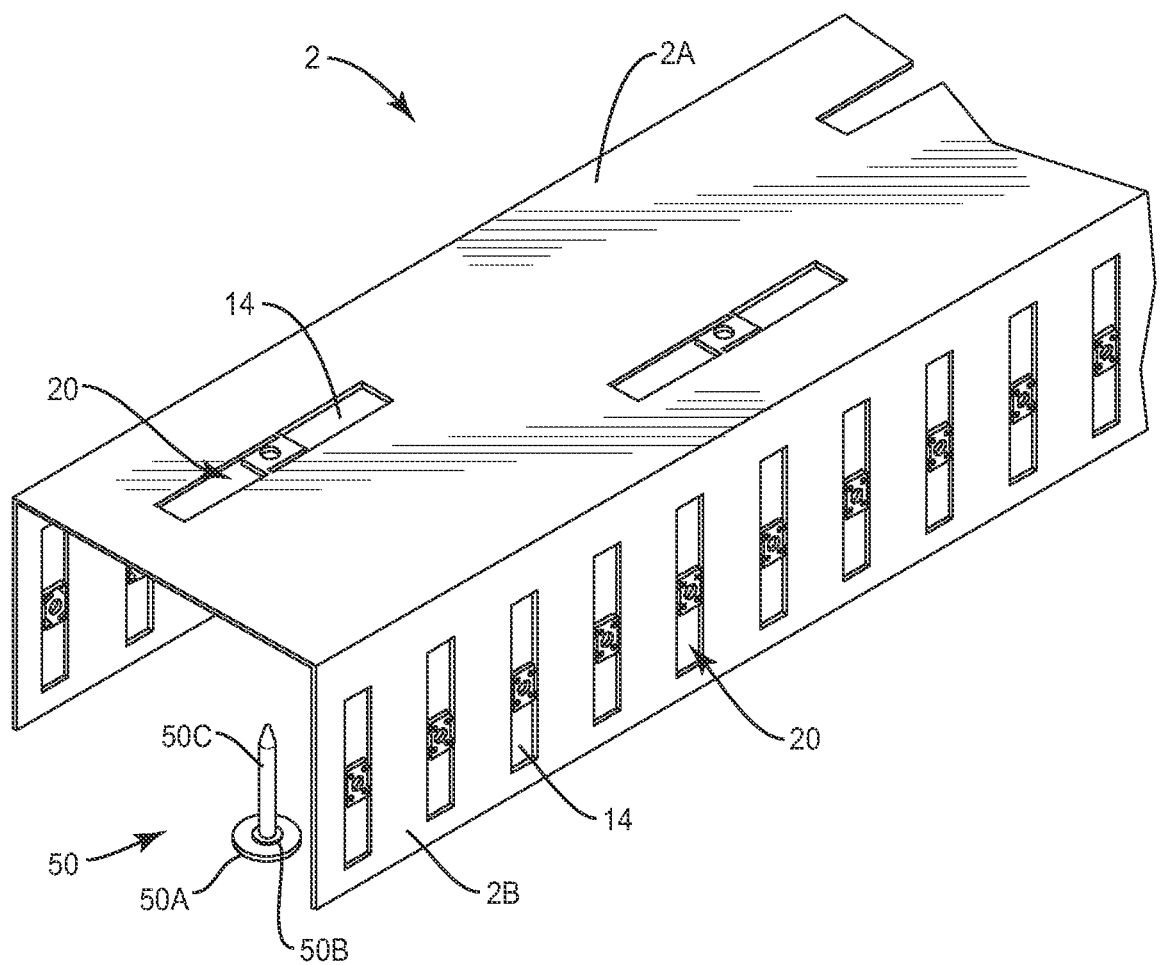
FIG. 12 is another alternate embodiment showing a track having the breakaway washer design of the present invention incorporated into both the flanges and web of the track.

Turning to FIG. 12, an alternative design for the track 2 is shown. In this case, there is provided breakaway washers 20 in the web 2A. Further there is provided a series of slots 14 in the web 2A. These slots 14 are longitudinally aligned with the web 2A. That is, the slots 14 in the web 2A extend generally normal with respect to the slots 14 in the flanges 2B. The breakaway washers 20 formed in the slots 14 in the web 2A are generally planar and do not include the raised dimples 20C or the burr 40 in this particular embodiment. It is appreciated that the breakaway washer 20 provided in the web 2A could include a design utilizing the raised dimples 20C or the burr 40. It is conversely appreciated that the design using the planar breakaway washers in the web 2A could be substituted for the dimpled or burred breakaway washer design in the flange 2B, where a shouldered screw would be used instead of a shouldered, powder actuated fastener.

To attach the track 2 to an adjacent structure, the fastener provided is what is commonly referred to as a powder actuated fastener. In the FIG. 12 embodiment the powder actuated fastener is indicated generally by the numeral 50. It includes a head 50A, a shoulder 50B and a shaft 50C. The shoulder 50B is designed to engage the breakaway washer 20. This is to prevent the fastener head 50A from directly engaging the web 2A and clamping it tightly against the adjacent building structure. The diameter of the shoulder 50B is smaller than the width of the slot 14.

In the case of the FIG. 12 embodiment, the breakaway washers 20 incorporated into the side flanges 2B are similar to those shown in FIGS. 1-3 with the raised dimples 20C. The advantage of the track 2 shown in FIG. 12 is that because of the breakaway washers 20 exist in both the flanges 2B and the web 2A, the track can move both horizontally and vertically. The breakaway washers 20 provided in the web 2A enable horizontal movement or drift while the breakaway washers 20 provided in the flanges 2B enable the track 2 to move vertically.

The terms "underside", "downward", "upward", "top", "bottom", "upper side", "upper", "horizontal", "vertical" and similar terms or variation of the terms may be used throughout this disclosure. The terms are used merely to illustrate various embodiments and are not intended to limit the scope of the invention in any way.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A building assembly, comprising:
a first building member having one or more elongated slots with each slot having a length and a width;
a second building member;
a connector assembly for connecting the first and second building members together such that the building members may move relative to each other while still being connected;
the connector assembly including one or more breakaway washers with each breakaway washer integrally formed in one slot of the first building member;
each breakaway washer having a fastener centering opening and one or more tabs projecting into edges of the slots;
a fastener extending through the centering opening of the breakaway washer and connected to the second building member so as to connect the first and second building members;
the breakaway washer having a face having a surface area;
the fastener including a flange that faces the face of the breakaway washer;
one or more raised dimples formed on the face of the breakaway washer and projecting towards the flange of the fastener for causing the breakaway washer to be fastened to the second building member when the fastener is tightened;
wherein the flange of the fastener engages the one or more dimples and the one or more dimples function as an interface between the flange and the surface area of the face of the breakaway washer and prevents the fastener flange from engaging the surface area of the breakaway washer face
wherein the dimples further maintain a spacing between the flange of the fastener and the flange of the first building member; and
wherein the breakaway washer is configured such that when a certain force is applied to the breakaway washer, the breakaway washer will break away from the slot and permit the slot to move relative to the fastener, breakaway washer, and second building member thereby permitting relative movement between the first and second building members.

2. The building assembly of claim 1 wherein the elongated slot includes opposed edges and wherein the breakaway washer includes a main body spaced inwardly from the opposed edges of the slot and a pair of offset tabs projecting from opposed edges of the main body to the edges of the slot such that the offset tabs connect the main body of the breakaway washer to the slot in the first building member.

3. The building assembly of claim 2 wherein the main body of the breakaway washer is generally rectangular shaped and wherein the pair of offset tabs project from opposed and offset corners of the rectangular shaped breakaway washer.

4. The building assembly of claim 1 wherein the breakaway washer is generally rectangular shaped and includes upper and lower edges that are substantially straight and two side edges.

5. The building assembly of claim 1 wherein the fastener includes a shaft and there is a direct transition from the shaft to the flange without an intervening shoulder.

6. The building assembly of claim 1 wherein the breakaway washer includes a main body having four corners and wherein there is provided at least two tabs projecting from the main body to edges of the slot and wherein the two tabs are offset and project from diagonally opposed corners of the main body of the breakaway washer.

7. The building assembly of claim 1 wherein the one or more dimples are raised approximately 0.005 inches above the face of the breakaway washer.

8. The building assembly of claim 1 wherein the face of the breakaway washer is flat and wherein the one or more dimples are elevated relative to the face of the breakaway washer.

9. A building assembly, comprising:
a first building member having one or more elongated slots with each slot having a length and a width;
a second building member;
a connector assembly for connecting the first and second building members together such that the building members may move relative to each other while still being connected;
the connector assembly including one or more breakaway washers with each breakaway washer integrally formed in one slot of the first building member;
each breakaway washer having a fastener centering opening;
a fastener extending through the centering opening of the breakaway washer and connected to the second building member so as to connect the first and second building members;
the breakaway washer having a face having a surface area;
the fastener including a flange that faces the face of the breakaway washer;
a raised burr formed on the face of the breakaway washer adjacent the centering opening of the breakaway washer, the burr projecting outwardly from the face of the breakaway washer towards the flange of the fastener such that the burr causes the breakaway washer to be affixed to the second building member when the fastener is tightened;
wherein the flange of the fastener engages the burr and the burr functions as an interface between the flange and the face of the breakaway washer and prevents the flange of the fastener from engaging the face of the breakaway washer;
wherein the burr maintains a spacing between the flange of the fastener and the first building member; and
wherein the breakaway washer is configured such that when a certain force is applied to the breakaway washer, the breakaway washer will break away from the slot and permit the slot to move relative to the fastener, breakaway washer, and second building member such that the first and second members can move relative to each other.

10. The building assembly of claim 9 wherein the burr extends around the centering opening of the breakaway washer.

11. The building assembly of claim 9 wherein the face of the breakaway washer is generally flat and wherein the burr includes a height of approximately 0.010 inches relative to the face of the breakaway washer.

12. The building assembly of claim 9 wherein the fastener comprises a shoulderless fastener.

13. The building assembly of claim 9 wherein the first member is a track including a web and a pair of flanges and wherein the one or more slots include at least two slots formed in the flanges of the track; and wherein the second member comprises a stud that is connected to the track via at least two fasteners.

14. The building assembly of claim 9 wherein the slot includes two opposed edges and the breakaway washer comprises a main body and a pair of tabs, and wherein the tabs project from the main body and join the edges of the slot.

15. A building structure for connecting to studs and for connecting to another building member, the building structure comprising:
a track having a web and a pair of flanges and configured to move both vertically and horizontally while being connected to the studs and to the other building member;
a series of flange slots formed in each flange with each slot having opposed edges and extending vertically and generally normal with respect to the web;
a breakaway washer integrally connected in the flange slots formed in each flange, each breakaway washer including a centering opening and a main body and one or more tabs projecting from the main body and joining at least one edge of the flange slot;
the breakaway washers integrally connected in the flange slots configured such that when a certain force is applied to the breakaway washers, the breakaway washers will break away from the associated slot and the slot will move relative to the breakaway washer;
one or more elongated web slots formed in the web with each web slot including opposed edges and extending parallel relative to the flanges and generally normal relative to the flange slots;
a breakaway washer integrally connected in each web slot and including a centering opening, a main body, and one or more tabs projecting from the main body and joining at least one edge of the web slot;
each breakaway washer integrally connected in a web slot configured such that when a certain force is applied to the breakaway washer integrally connected in the web slot, the breakaway washer will break away and wherein the web slot can move horizontally about the breakaway washer;
wherein when the breakaway washers within the flange slot break away, the track is moveable vertically;
wherein when the breakaway washer in the web slot breaks away, the track is moveable horizontally; and
wherein when the breakaway washers in the flange slots and the web slots break away, the track is moveable both vertically and horizontally.

16. The building structure of claim 15 further including a powder actuated fastener for extending through the centering opening of the breakaway washer in the web of the track.

17. The building structure of claim 16 wherein the powder actuated fastener includes a shoulder and wherein the breakaway washer in the web slot includes a main body that includes a planar face configured to engage the shoulder of the powder actuated fastener.

18. The building structure of claim 15 wherein the breakaway washer in each flange slot includes a planar face.

19. A connector assembly for connecting to at least one structural member, comprising:
a connecting member;
at least one elongated slot formed in the connecting member, the elongated slot including opposed edges;

a breakaway washer connected to the slot and including a main body having a fastener center opening and at least one tab projecting from the main body and connected to one edge of the slot such that the main body is suspended in the slot by the at least one tab;

the main body of the breakaway washer including a face;

a fastener having a flange and a shaft extending through the centering opening, the flange of the fastener facing the face of the breakaway washer;

one or more dimples or a burr formed on the face of the breakaway washer and elevated with respect to the face of the breakaway washer for engaging the flange of the fastener such that there exists a space between the flange of the fastener and the connecting member; and wherein the breakaway washer is configured such that when a force is applied to the breakaway washer, the breakaway washer will break away and permit relative movement between the slot and the combination of the breakaway washer, fastener, and connecting member.

20. The connector assembly of claim 19 including the burr and wherein the burr extends around the fastener centering opening and is at least slightly elevated with respect to the face of the breakaway washer.

21. The connector assembly of claim 19 wherein there is provided a series of raised dimples formed on the face of the breakaway washer and wherein the raised dimples are disposed outwardly of the face of the breakaway washer.

22. The connector assembly of claim 21 wherein there is a depression formed underneath each dimple and wherein the depression causes the material of the breakaway washer to extend outwardly towards the edges of the slot and effectively limits the side-to-side movement of the breakaway washer.

* * * * *